United States Patent
Sanguineti et al.

(10) Patent No.: US 8,264,977 B2
(45) Date of Patent: Sep. 11, 2012

(54) SIGNAL QUALITY INDICATOR

(75) Inventors: Antonella Sanguineti, Chiavari (IT); Riccardo Martinotti, Savona (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 158 days.

(21) Appl. No.: 12/444,504

(22) PCT Filed: Oct. 6, 2006

(86) PCT No.: PCT/EP2006/009699
§ 371 (c)(1),
(2), (4) Date: May 5, 2009

(87) PCT Pub. No.: WO2008/040378
PCT Pub. Date: Apr. 10, 2008

(65) Prior Publication Data
US 2010/0027433 A1 Feb. 4, 2010

(51) Int. Cl.
*G01R 31/08* (2006.01)
*H04J 3/16* (2006.01)
(52) U.S. Cl. ........ 370/252; 370/241; 370/217; 370/229; 370/465; 714/704; 714/751; 714/776; 714/799; 375/227; 375/285; 375/346
(58) Field of Classification Search .................. 370/252, 370/241, 217, 229, 242, 465, 468; 714/704, 714/751, 776, 799; 375/227, 285, 296, 346; 702/185
See application file for complete search history.

(56) References Cited

U.S. PATENT DOCUMENTS

| | | | | |
|---|---|---|---|---|
| 6,456,847 | B1* | 9/2002 | Lilja et al. | 455/437 |
| 7,158,481 | B1* | 1/2007 | Saari | 370/235 |
| 7,305,005 | B1* | 12/2007 | Wu et al. | 370/463 |
| 2002/0147947 | A1* | 10/2002 | Mayweather et al. | 714/704 |
| 2003/0007454 | A1* | 1/2003 | Shorey | 370/229 |
| 2005/0039103 | A1* | 2/2005 | Azenko et al. | 714/776 |

FOREIGN PATENT DOCUMENTS
WO 03/096601 A1 11/2003

OTHER PUBLICATIONS

Maarten Vissers, "BER value of TLV in LMP-WDM", Aug. 7, 2001, Lucent Technologies, Section 6.2.3.*
Author Unknown. "HFTA-05.0: Statistical Confidence Levels for Estimating BER Probability." Maxim Application Notes, Oct. 26, 2000. XP002245050.

* cited by examiner

*Primary Examiner* — Michael Thier
*Assistant Examiner* — Jamal Javaid
(74) *Attorney, Agent, or Firm* — Coats & Bennett, P.L.L.C.

(57) ABSTRACT

A method of deriving an indicator of the signal quality in an in-service packet-based network at least having means to detect errors in packets and means to determine the overall amount of network traffic received. The method comprises the steps of: obtaining a value of the number of packets received having errors therein; obtaining a value of the overall amount of the network traffic received; calculating the indicator of signal quality (eBER) using the ratio of the number of packets received having errors therein to the overall amount of network traffic received.

10 Claims, 1 Drawing Sheet

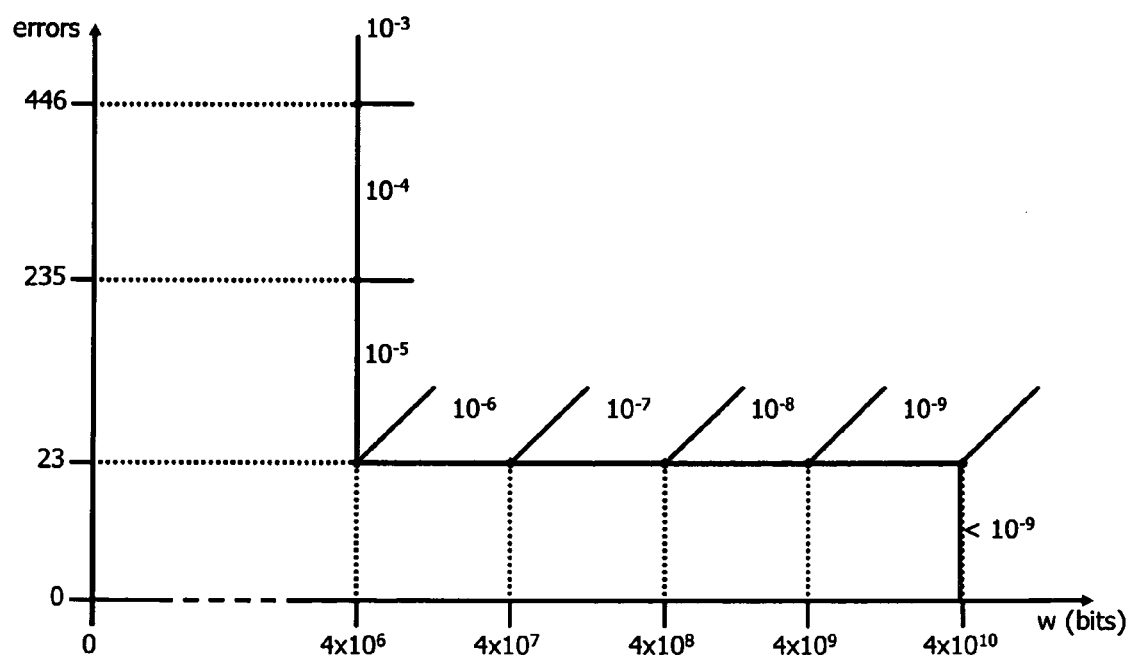

SIGNAL QUALITY INDICATOR

This invention relates to an indicator of the signal quality in an in-service packet-based network and means to derive said indicator. In particular, it relates to an indicator of signal quality in an in-service Ethernet network.

The fundamental measure of signal quality in a digital communications system is the bit error rate (BER). The BER is a measure of the number of bits that are incorrectly received at a target node from a source node over a communications channel. The bit errors are caused by degradation of the signal. The BER is a familiar measure to those skilled in the art and the signal quality of a communication system can be readily interpreted from the BER value.

Thus, in circuit networks, where a dedicated channel is set up between the source node and the target node, the BER is used to monitor the end-to-end network performance. For example, in an Open Transport Network, ODU is used to derive the BER. However, in packet-based networks, such as Ethernet, BER is not used and instead different performance monitoring indicators are provided.

In an Ethernet network a tool such as Operations, Administration and Maintenance (OAM) may be used to monitor network performance. The OAM tool provides means for network and service monitoring. The OAM tool is mainly focused on end-to-end verification, and can provide indication on frame loss, due to either errors and faults or congestion. However this is achieved by means of protocols exchanged over the network, which requires equipment processing and bandwidth occupation over the physical links.

In addition RFC documents for Ethernet propose various sets of performance counters (e.g., RMON etherStatsTable), but despite being useful for determining short-term network performance they are not as well known or readily interpreted as the BER.

According to the present invention, we provide a method of deriving an indicator of the signal quality in an in-service packet-based network, said network at least having means to detect errors in packets and means to determine the overall amount of network traffic received, the method comprising the steps of;
  obtaining a value of the number of packets received having errors therein;
  obtaining a value of the overall amount of the network traffic received; calculating the indicator of signal quality (eBER) using the ratio of the number of packets received having errors therein to the overall amount of network traffic received.

This is advantageous as the signal quality indicator (eBER) of the invention has been found to correlate closely with the BER of the connection, while allowing the network to be monitored while in-service. Thus, this estimated BER (i.e. eBER) provides those skilled in the art with a readily recognized measure of signal quality without the need to take the packet-based network out of service. The network can remain in-service and thus be used for communication while the indicator of signal quality is obtained.

Preferably, the measure of the number of packets received having errors therein is obtained using standard counters that are part of the network standard. Preferably the measure of the overall amount of the network traffic received is obtained using standard counters that are part of the network standard. By using standards counters that are part of the network's standard, the indicator of the invention can be easily implemented and is efficiently obtained Preferably the packet-based network is an Ethernet network. If the network is an Ethernet network, said method preferably uses the statistical counter etherStatsOctets as the value of the overall amount of network traffic received and etherStatsCRCAlignErrors as the value of the number of packets received having errors therein, and wherein the signal quality indicator (eBER) is defined as;

$$eBER = \frac{etherStatsCRCAlignErrors}{etherStatsOctets \times 8}$$

Most preferably the network also has means to determine the statistical counters etherStatsFragments and etherStatsJabbers, and wherein these counters, as well as the counter etherStatsCRCAlignErrors, are used to obtain the value of the number of packets received having errors therein, and wherein the signal quality indicator (eBER) is defined as;

$$eBER = \frac{etherStatsCRCAlignErrors + etherStatsFragments + etherStatsJabbers}{etherStatsOctets \times 8}$$

Alternatively, the packet-based network may be a Fibre Channel network. In such a case, the method preferably uses counters that are available from relevant RFCs, such as RFC 4044. Thus, the statistical counter ifinOctets may be used as the value of the overall amount of network traffic received and fcmPortInvalidCRCs as the value of the number of packets received having errors therein Preferably the eBER value is calculated over a predetermined number of sampled packets. It will be appreciated that the number of sampled packets used in the calculation of eBER affect the accuracy. Thus, the number of sampled packets over which to calculate must be chosen to give an appropriate level of accuracy. The eBER value may be calculated over a predetermined measurement interval of bits. However, to ensure a particular level of accuracy, the measurement interval is preferably adjusted to compensate for signal rate and the traffic profile across the network.

Preferably the eBER value is calculated only when the number of packets having errors therein over the measurement interval is between a lower and higher threshold. By appropriately selecting these threshold values, it can be ensured that the calculated eBER value is sufficiently accurate. Preferably, the threshold values are selected such that;
  With $BER \geq 10^{-x}$ the probability to estimate $BER = 10^{-x}$ within the measuring interval shall be $\geq 0.99$.
  With $BER \leq 10^{-x}$ the probability to estimate $BER = 10^{-(x+1)}$ within the measuring interval shall be $\leq 10^{-6}$.
  With $BER \geq 10^{-x}$ the probability to estimate $BER = 10^{-(x+1)}$ within the measuring interval shall be $\leq 10^{6}$.

Preferably, the method includes the step of optimising the network based on the signal quality indicator. Optimisation may include repairing of transmission media, transmitter and receiver devices, and/or means of increasing the signal-to-noise ratio over the link, after notification of degraded eBER by this method.

According to a second aspect of the present invention, we provide signal quality indicator means for providing a measure of the signal quality in an in-service packet-based network, said network at least having means to detect errors in packets and means to determine the overall amount of network traffic received, comprising data acquisition means to obtain a value of the number of packets received having errors therein and a value of the overall amount of the network traffic received, and wherein the signal quality indicator means calculates the signal quality using the ratio of the number of packets received having errors therein to the overall amount of network traffic received.

This is advantageous as the indicator means provides a collectable measure of signal quality that is readily understood by those skilled in the art. Further, the signal quality can be determined while the network is in service and with minimal use of network or system resources. There now follows, by way of example only, a detailed description of an embodiment of the invention with reference to the drawing.

The present invention is applicable to packet-based networks such as Ethernet. The invention will be discussed in relation to Ethernet networks, however, it will be appreciated that the invention can be deployed on any packet-based network and any layer of the network provided that the network/layer supports error detection codes over packets and allows the collection of basic statistic counters related to the overall amount of traffic received.

The present invention is particularly applicable to Ethernet networks as it takes advantage of the fact that the aforementioned requirements are available in standard applications forming part of the statistics functionality.

The packets or frames of an Ethernet network support the use of error detection codes over the packets by providing a cyclic redundancy check (CRC) as the error detection code. This code is transmitted on each packet in the 4-octet Frame Check Sequence (FCS) field. The value of the FCS field is computed as a function of the contents of the source address, destination address, length, Logic Link Control (LLC) data and pad (that is, all fields except the preamble, SFD, FCS, and extension). It is common knowledge in the art that the encoding is defined by the following generating polynomial and will therefore not be discussed in detail.

$$G(x) = x_{32} + x_{26} + x_{23} + x_{22} + x_{16} + x_{12} + x_{11} + x_{10} + x_8 + x_7 + x_5 + x_4 + x_2 + x + 1$$

Mathematically, the CRC value corresponding to a given frame is defined by the following procedure:

a) The first 32 bits of the frame are complemented.
b) The n bits of the frame are then considered to be the coefficients of a polynomial M(x) of degree n−1. (The first bit of the Destination Address field corresponds to the $x_{(n-1)}$ term and the last bit of the data field corresponds to the $x_0$ term.)
c) M(x) is multiplied by $x_{32}$ and divided by G(x), producing a remainder R(x) of degree ≦31.
d) The coefficients of R(x) are considered to be a 32-bit sequence.
e) The bit sequence is complemented and the result is the CRC.

The 32 bits of the CRC value are placed in the FCS field so that the X31 term is the leftmost bit of the first octet, and the $x_0$ term is the right most bit of the last octet. (The bits of the CRC are thus transmitted in the order $x_{31}$, $x_{30}$, . . . , $x_1$, $x_0$.)

The Internet Engineering Task Force (IETF) organization has defined several statistical counters to support performance monitoring on Ethernet interfaces. In particular, the counters defined as etherStatsOctets, etherStatsCRCAlignErrors, etherStatsJabbers and etherStatsFragments can be used in determining the signal quality indicator of the invention. These statistical counters are specified within RFC 2819 (Remote Network Monitoring MIB) and are defined as follows;

etherStatsOctets OBJECT-TYPE
    SYNTAX Counter32
    UNITS "Octets"
    MAX-ACCESS read-only
    STATUS current
    DESCRIPTION
      "The total number of octets of data (including those in bad packets) received on the network (excluding framing bits but including FCS octets). [ . . . ]"
    ::={etherStatsEntry 4}
etherStatsFragments OBJECT-TYPE
    SYNTAX Counter32
    UNITS "Packets"
    MAX-ACCESS read-only
    STATUS current
    DESCRIPTION
      "The total number of packets received that were less than 64 octets in length (excluding framing bits but including FCS octets) and had either a bad Frame Check Sequence (FCS) with an integral number of octets (FCS Error) or a bad FCS with a non-integral number of octets (Alignment Error) [ . . . ]
    ::={etherStatsEntry 11}
etherStatsJabbers OBJECT-TYPE
    SYNTAX Counter32
    UNITS "Packets"
    MAX-ACCESS read-only
    STATUS current
    DESCRIPTION
    "The total number of packets received that were longer than 1518 octets (excluding framing bits, but including FCS octets), and had either a bad Frame Check Sequence (FCS) with an integral number of octets (FCS Error) or a bad FCS with a non-integral number of octets (Alignment Error). [ . . . ]
    ::={etherStatsEntry 12}
etherStatsCRCAlignErrors OBJECT-TYPE
    SYNTAX Counter32
    UNITS "Packets"
    MAX-ACCESS read-only
    STATUS current
    DESCRIPTION
      "The total number of packets received that had a length (excluding framing bits, but including FCS octets) of between 64 and 1518 octets, inclusive, but had either a bad Frame Check Sequence (FCS) with an integral number of octets (FCS Error) or a bad FCS with a non-integral number of octets (Alignment Error)."
    ::={etherStatsEntry 8}

Accordingly, the signal quality indicator of the invention can be calculated from the above statistical measures as defined in equation 1.

$$eBER = \frac{etherStatsCRCAlignErrors + etherStatsFragments + etherStatsJabbers}{etherStatsOctets \times 8} \quad (1)$$

In order to have acceptable levels of statistical confidence, it is necessary to collect the performance counters over an appropriate number of sampled packets. This means that the measurement interval over which such parameters are to be monitored is not fixed, but depends on the signal rate, traffic profile and the desired statistical confidence. Some statistical considerations that may be used to find the number of monitored packets (or the interval) that ensure a sufficient confidence in the equation above are discussed in detail below.

A given BER is assessed when the number of errors detected over a given measurement interval w is within two defined confidence thresholds (th_low and th_high). The suggested rule to define these thresholds derives from ITU-T G.806, which is commonly adopted for SDH networks. It is as follows:

With $BER \geq 10^{-x}$ the probability to estimate $BER=10^{-x}$ within the measuring interval shall be $\geq 0.99$.

With $BER \leq 10^{-x}$ the probability to estimate $BER=10^{-(x+1)}$ within the measuring interval shall be $\leq 10^{-6}$.

With $BER \geq 10^{-x}$ the probability to estimate $BER=10^{-(x+1)}$ within the measuring interval shall be $\leq 10^{-6}$.

Given that:
A sequence of n bits
A set of s sequences
An error probability (Poisson distribution) on single bit p (BER).
The error probabilities on sequence are:

$$P(m \text{ errors}) = \binom{n}{m} p^m (1-p)^{n-m}$$

The probability that a sequence is corrupted is:

$$e = \sum_{m \geq 1} P(m)$$

It is possible to define the probability that t sequences on s are errored (containing one or more errors).

The error probabilities on set are:

$$P(t \text{ sequencies}) = \binom{s}{t} e^t (1-e)^{s-t}$$

The medium number of errored sequences is: $\bar{t} = e \cdot s$

Given a confidence c (i.e. c=0.9; c=0.99; c=0.999), a lower and an upper threshold (th_low and th_high) with equal distance from t can be set to give:

$$\sum_{t \geq th\_low}^{t \leq th\_high} P(t) \geq c.$$

The upper condition states that if you find a number t of errored sequences, among a set of s, between throw and th_high, you have a confidence $\geq c$ that the BER received is p.

Thresholds th_low and th_high depend only on the observation window $w=n \cdot s$, with the assumption that the error detection code (i.e. CRC in Ethernet) ensures that at most 1 error is detected in each sequence s.

In real scenarios the eBER signal quality indicator of the invention can be used to assess the status of a network and to give an early warning of progressive signal degradation.

For this purpose it can be used in different ways:
Fault monitoring—the eBER is compared with raise and clear thresholds in order to trigger a degrade defect in analogous ways to well known techniques (e.g. EXC in SDH).

Performance monitoring—periodically collected and stored in performance registers to be processed by management systems at various levels (e.g. EM, NM)

Both these uses allow a network operator to monitor transmissions on a packet-based network in a similar way as legacy Time Division Multiplexing (TDM) networks. Thus, the invention can provides a relevant improvement in capital expenditure and is a useful feature in carrier class environments.

For Fault Monitoring purposes, it is necessary to define the error levels at which a degraded BER defect is declared. Following traditional TDM approach these levels are chosen among $10^{-x}$ with $x \in [3, 4, \ldots 9]$.

Associated to each BER level $10^{-x}$, the method foresees two thresholds that are necessary to raise and clear the defect; they are defined as follows:

$$th\_\text{raise } (10^{-x}) = th\_\text{low}(10^{-x})$$

$$th\_\text{clear}(10^{-x}) = th\_\text{high}(10^{-(x+1)})$$

In the following table measurement interval w (measured in bits), and raise and clearing thresholds th_raise and are th_clear respectively provided for various different decades of BER:

| BER    | w      | th_raise | th_clear |
|--------|--------|----------|----------|
| 1,E−03 | 4,E+06 | 446      | 316      |
| 1,E−04 | 4,E+06 | 235      | 54       |
| 1,E−05 | 4,E+06 | 24       | 9        |
| 1,E−06 | 4,E+07 | 24       | 9        |
| 1,E−07 | 4,E+08 | 24       | 9        |
| 1,E−08 | 4,E+09 | 24       | 9        |
| 1,E−09 | 4,E+10 | 24       | 9        |

For Performance Monitoring purposes, the above values can be used to estimate BER. The number of errors detected shall be compared against the values after each step of w, summarized in the graph of FIG. 1.

The present invention provides an effective, accurate and easily recognisable measure of signal quality of an in-service packet-based network. Different approaches to monitor the quality of signals in different packet-based environments have been suggested, but they have been found to be overly complicated to let them be useful on real equipment, where memory, computational power and response times are key aspects. The present invention, on the contrary, provides non-intrusive monitoring that makes use of commonly implemented performance counters (IETF RMON). The signal quality indicator of the invention provides an adequate level of accuracy that is needed for carrier-class equipment. This has the advantage that specific dedicated resources are not required for it to be implemented.

Indeed, for both performance and fault monitoring it provides an easy method to quickly access the status of a traffic interface. Thus, standard compliant packet-based networks usually provide an amount of performance counters, but it is difficult to correlate them to give a definitive measure of the state of the monitored interface. To overcome this, the invention uses the information of the raw counters in such a way to provide a reliable and recognisable indication of the quality level. This indication provides a homogenous parameter over non-homogenous environments (e.g. TDM/WDM vs. packet networks).

The invention claimed is:
1. A method of deriving an indicator of the signal quality in an in-service Ethernet network, said network at least having an error detection function to detect errors in packets, and a counting function to determine an overall amount of network traffic received, the method comprising:

obtaining, from the Ethernet network, a first value representing a number of packets received having errors therein using an etherStatsCRCAlignErrors standard counter;

obtaining, from the Ethernet network, a second value representing an overall amount of network traffic received using an etherStatsOctets standard counter; and calculating an indicator of signal quality, for the Ethernet network, based on a ratio of the number of packets received having errors therein to the overall amount of network traffic received by:

calculating an estimated Bit Error Rate (eBER) over a measurement interval of a predetermined number of sampled packets using $$eBER = \frac{etherStatsCRCAlignErrors}{etherStatsOctets \times 8};$$

and adjusting the measurement interval to compensate for a signal rate, and a traffic profile across the in-service Ethernet network.

2. The method of claim 1 wherein the indicator of signal quality is the estimated Bit Error Rate (eBER).

3. The method of claim 1 wherein obtaining a first value representing a number of packets received having errors therein comprises obtaining the first value using standard counters that are part of a standard associated with the in-service Ethernet network.

4. The method of claim 1 wherein obtaining a second value representing an overall amount of network traffic received comprises obtaining the second value using counters that are part of a standard associated with the in-service Ethernet network.

5. The method according to claim 1 wherein:

obtaining a second value representing an overall amount of network traffic received further comprises obtaining the second value using the etherStatsCRCAlignErrors, etherStatsFragments and etherStatsJabbers standard counters associated with the in-service Ethernet network; and wherein calculating an indicator of signal quality further comprises calculating the estimated Bit Error Rate (eBER) using $$eBER = \frac{etherStatsCRCAlignErrors + etherStatsJabbers + etherStatsFragments}{etherStatsOctets \times 8}.$$

6. The method of claim 1 wherein calculating the eBER value comprises calculating the eBER only when the number of packets having errors therein over the measurement interval is between a first threshold and a second threshold.

7. The method of claim 1 further comprising selecting threshold values such that:

with the $BER \geq 10^{-x}$ the probability to estimate a $BER = 10^{-x}$ within the measuring interval is $\geq 0.99$;

with the $BER \leq 10^{-x}$ the probability to estimate a $BER = 10^{-(x+1)}$ within the measuring interval is $\leq 10^{-6}$; and with the $BER \geq 10^{-x}$ the probability to estimate a $BER = 10^{-(x+1)}$ within the measuring interval is $\leq 10^{-6}$.

8. The method of claim 1 wherein calculating an indicator of signal quality further comprises calculating the estimated Bit Error Rate (eBER) over a measurement interval of a predetermined number of bits.

9. The method of claim 8 further comprising selecting threshold values such that:

with the $BER \geq 10^{-x}$ the probability to estimate a $BER = 10^{-(x+1)}$ within the measuring interval is $\geq 0.99$;

with the $BER \leq 10^{-x}$ the probability to estimate a $BER = 10^{-(x+1)}$ within the measuring interval is $\leq 10^{-6}$; and with the $BER \geq 10^{-x}$ the probability to estimate a $BER = 10^{-(x+1)}$ within the measuring interval is $\leq 10^{-6}$.

10. The method of claim 1 further comprising the step of optimizing the in-service Ethernet network based on the signal quality indicator.

* * * * *